(12) United States Patent
Trank et al.

(10) Patent No.: US 7,036,405 B2
(45) Date of Patent: May 2, 2006

(54) KEY WITH RETRACTABLE PATTERN

(75) Inventors: Andrew David Trank, Orchard Park, NY (US); Wayne Anthony Hemmerling, Orchard Park, NY (US)

(73) Assignee: McGard, LLC, Orchard Park, NY (US)

( * ) Notice: Subject to any disclaimer, the term of this patent is extended or adjusted under 35 U.S.C. 154(b) by 40 days.

(21) Appl. No.: 10/736,221

(22) Filed: Dec. 15, 2003

(65) Prior Publication Data

US 2005/0126349 A1    Jun. 16, 2005

(51) Int. Cl.
*B25B 23/00* (2006.01)
(52) U.S. Cl. .............................. 81/460; 81/436; 81/451
(58) Field of Classification Search .................. 81/460, 81/461, 436, 451; 411/910
See application file for complete search history.

(56) References Cited

U.S. PATENT DOCUMENTS

| 2,698,637 | A | * | 1/1955  | Donovan      | 81/451  |
| 3,288,185 | A | * | 11/1966 | Clark        | 81/451  |
| 3,739,825 | A | * | 6/1973  | Knox         | 81/451  |
| 4,130,152 | A | * | 12/1978 | Bolen        | 81/451  |
| 4,618,299 | A | * | 10/1986 | Bainbridge et al. | 81/451 |
| 4,648,293 | A |   | 3/1987  | McCauley     | 81/436  |
| 4,848,113 | A |   | 7/1989  | Parks        | 70/259  |
| 4,875,819 | A |   | 10/1989 | Wilkinson    | 411/432 |
| 6,161,456 | A | * | 12/2000 | Langford     | 81/451  |
| 2003/0165371 | A1 |  | 9/2003 | Notaro et al. | 411/402 |

\* cited by examiner

*Primary Examiner*—Debra S Meislin
(74) *Attorney, Agent, or Firm*—Walter W. Duft

(57) ABSTRACT

A key for operating a security fastener having a lock pattern includes a retractable key pattern. The key pattern has an operational extension position in which the key pattern is enabled for substantial engagement with a security fastener having a matching lock pattern, thereby allowing operation of the matching security fastener. The key pattern is also capable of retreating a non-operational retraction position in which the key pattern is not capable of substantial engagement with a security fastener having a non-matching lock pattern, thereby preventing operation of the non-matching security fastener.

40 Claims, 18 Drawing Sheets

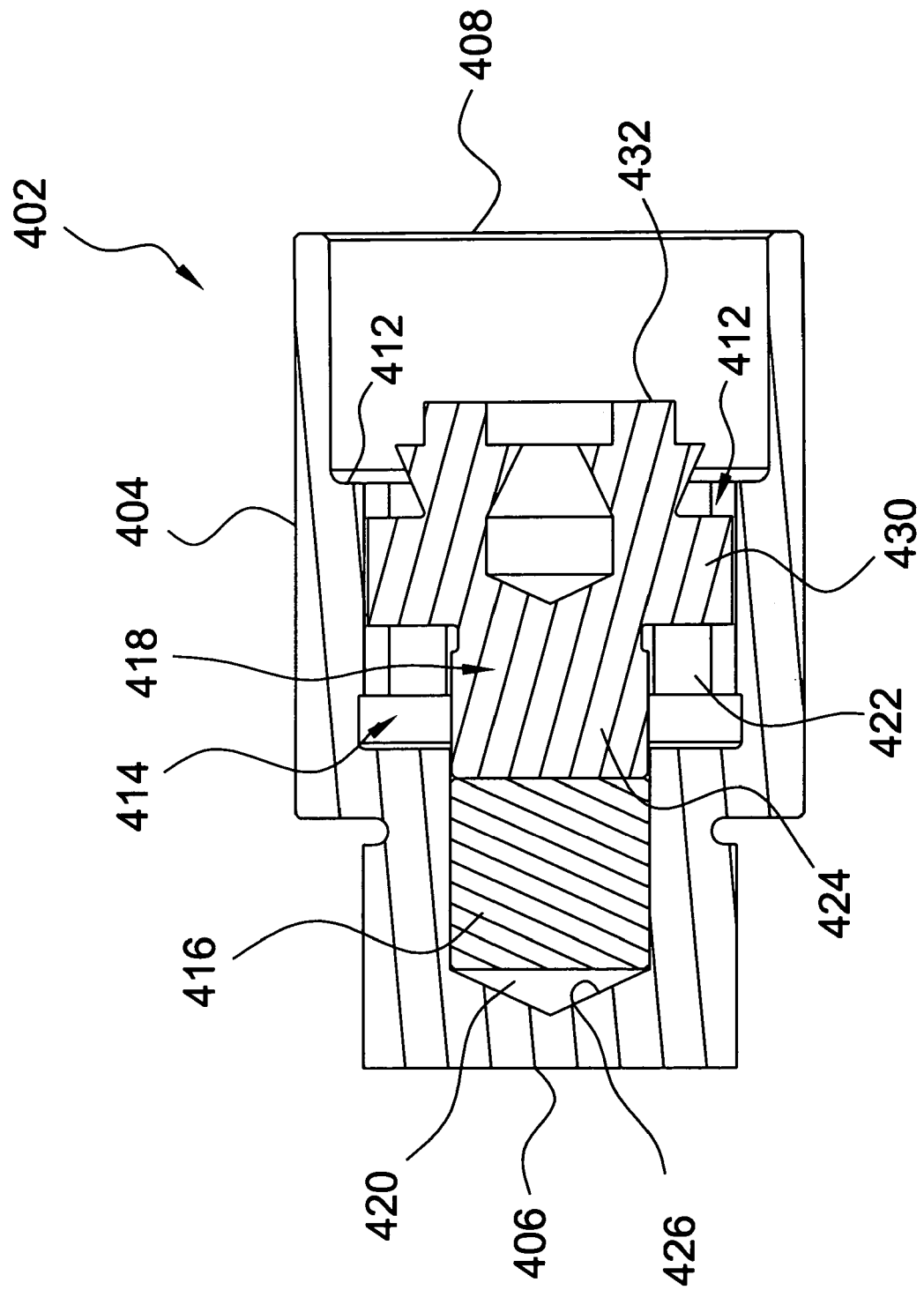

KEY WITH RETRACTABLE PATTERN

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to keys for security (antitheft) fasteners such as locking wheel nuts and wheel bolts used to secure vehicular wheels.

2. Description of the Prior Art

By way of background, locking wheel nuts and wheel bolts are commonly used to attach wheels to axle hub assemblies of automobiles and other vehicles. These security fasteners are designed with security features that are intended to thwart theft by rendering the fasteners difficult to remove with conventional tools. In particular, the fasteners do not have the usual hexagonal head pattern found on conventional nuts and bolts, and instead have smooth cylindrical side walls that cannot be gripped by standard wrenches. Fastener removal requires the use of a special security key having a key head formed with a unique key pattern that matches a corresponding lock pattern formed on the fastener end face. It is to improvements in security keys of the foregoing type and the prevention of unauthorized security fastener removal that the present invention is directed.

BRIEF SUMMARY OF THE INVENTION

The foregoing goals are achieved and an advance in the art is provided by an improved key for operating a security fastener having a lock pattern. The key features a retractable key pattern that is normally in an operational extension position in which it is enabled for substantial engagement with a security fastener having a matching lock pattern, thereby allowing operation of the matching security fastener. However, in the event that an outside tampering force in excess of a normal operational force is applied to the key pattern (such as the force that would be imparted if an attempt was made to slam the key pattern into a security fastener having a non-matching lock pattern), the key pattern will retract into a non-operational retraction position in which it is prevented from substantially engaging a security fastener having the non-matching lock pattern, thereby preventing operation of the non-matching security fastener.

In exemplary embodiments of the invention, the key includes a retraction control member that can be alternatively implemented using a biasing element, a breakable element, a crushable element or any other suitable expedient that will resist retraction of the key pattern until the tampering force is applied. The retraction control member is located to engage a key head that carries the key pattern at one end thereof. The key head is disposed in a key well that accommodates movement of the key head as the key pattern retracts. The key well is part of a key housing that includes a base end adapted for imparting torque to the key, such as by way of a handle or a gripping tool, and a fastener-receiving end that may include an open-ended shroud for guiding the key onto the end of a security fastener. A stop surface is provided on the key for contacting an area of the security fastener as the key pattern retracts to a retraction position under application of the tampering force. The stop surface prevents the security fastener's lock pattern from following the key pattern into the key well to its retraction limit.

BRIEF DESCRIPTION OF THE SEVERAL VIEWS OF THE DRAWINGS

The foregoing and other features and advantages of the present invention will be apparent from the following more particular description of the preferred embodiments of the invention, as illustrated in the accompanying Drawings, in which:

FIG. 12A is a cross-sectional centerline view of view of the key of FIG. 11 with its key pattern in an operational extension position.

DETAILED DESCRIPTION OF THE INVENTION

With reference now to the above-identified Drawings, wherein like reference numbers designate like elements in all of the several views, embodiments of the invention will now be presented by way of five exemplary key constructions representing alternative implementations of the inventive subject matter. The five exemplary constructions are respectively shown in FIGS. 1–4B, 5–6B, 7–8B, 9–10B and 11–12B. Except as otherwise indicated below when discussing alternative retraction control member constructions, it will be understood that all components used in the disclosed key constructions are fabricated from either steel, titanium, high-strength aluminum or other durable suitable materials for automotive and vehicular use.

I. First Exemplary Key Construction

Figure 1:
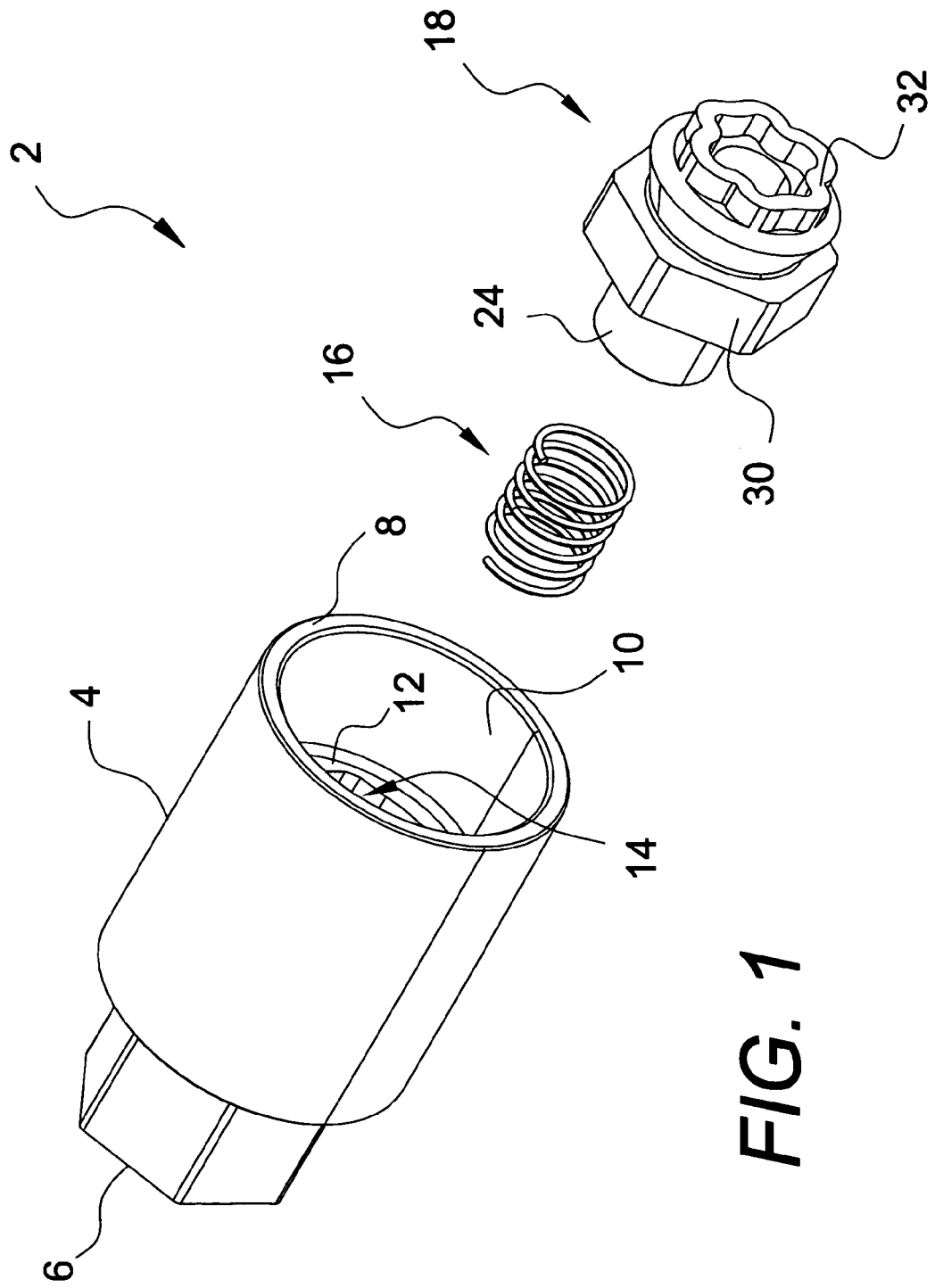
FIG. 1 is an exploded perspective view of a first key exemplary construction in accordance with the invention.

Turning now to FIG. 1, a key 2 according to a first exemplary key construction includes a key housing 4 having a base end 6 and a fastener-receiving end 8. By way of example only, the base end 6 can be formed as a male drive element of hexagonal shape that is either integrally formed with the main cylindrical portion of the housing 4 or attached thereto as a separate element. This configuration allows the base end 6 to receive a handle (not shown) or a tool (not shown), such as a wrench, that is capable of imparting operational torque to the housing 4. Other suitable male (or female) configurations providing a torque transfer capability may likewise be used for the design of the base end 6, including but not limited to external or internal shapes that are hexagonal, square, star, slotted, pinned, to name but a few. For example, in a female drive configuration, the base end 6 could be formed with a square internal opening in the housing 4 so that the key 2 can be mounted in the manner of a conventional socket to a conventional socket wrench. Note that the base end 6 could also be configured itself as a handle or a tool that is integrally formed as part of the housing 4.

The fastener-receiving end 8 of the housing 4 can be configured as a generally tubular shroud 10 that is either integrally formed with the main cylindrical portion of the housing 4 or attached thereto as a separate element. The shroud 10 extends from a recessed ledge portion 12 of the housing 4 and can be of any suitable length consistent with its function of helping guide the key 2 onto the end of a security fastener. If desired, however, the shroud 10 could be eliminated, in which case the fastener-receiving end 8 of the housing 4 will be defined by the ledge 12, which would no longer be recessed. The ledge 12 itself is formed as a generally annular surface that is transversely oriented relative to the housing's longitudinal axis. It terminates inwardly at the edge of a key well 14 formed in the housing's main cylindrical portion. As shown in FIG. 1, and as described in more detail below, the key well 14 is configured to carry a biasing element in the form of a coil spring 16 and a key head 18 therein.

Figure 2A:
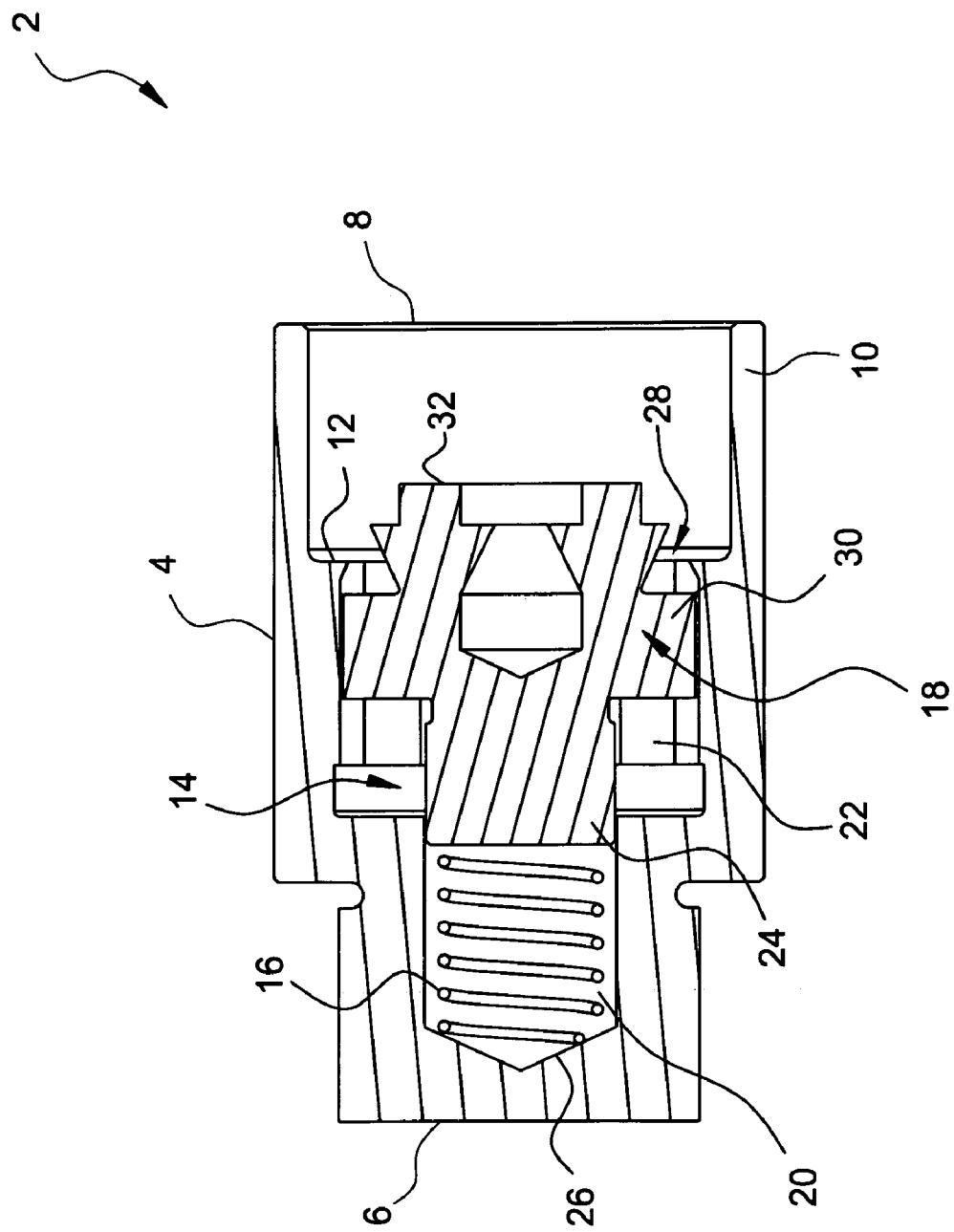
FIG. 2A is a cross-sectional centerline view of the key of FIG. 1.

With additional reference now to FIG. 2A, the key well 14 is shown to include a bore 20 and a main guide way 22. The bore 20 is adapted to carry the spring 16 and to slideably receive a stem 24 of the key head 18. Note that the bore 20 and the stem 24 are optional insofar as the spring 16 could be located in the main guide way 22 and engage a key head configured without a stem. However, the design shown in FIG. 2A ensures proper guidance of the key head 18 by slideably supporting the stem 24 as it interacts with the spring 16. Although the bore 20 and the stem 24 are both shown to be cylindrical in cross-sectional shape, it will be appreciated that other shapes could also be used.

One end of the bore 20 can be closed by a back wall 26 of the key well 14 in order to support the base of the spring 16. Alternatively, in lieu of the closed back wall 26, an annular ledge (not shown) could be formed to support the spring 16. Thus, although the key well 14 is shown to closed-ended, it need not be so and could open to the base end of the housing 4 if desired. The other end of the bore 20 opens to the main guide way 22. The main guide way 22 extends to a key head-receiving opening 28 where the key well 14 meets the ledge 12. An enlarged intermediate guide flange portion 30 of the key head 18 slideably engages the sides of the key well's main guide way 22. It will be seen that the guide flange 30 and the guide way 22 are both hexagonal in cross-sectional shape. This allows torque to be transferred from the housing 4 to the key head 18, which can then transfer torque to a security fastener through a key pattern to be described below. It will be appreciated that many other configurations could be used to provide the required housing-key head torque transfer, including but not limited to other non-circular cross-sectional configurations, spline configurations, pin configurations, set-screw configurations, to name but a few. Indeed, any configuration that enables the key head 18 to slide within the key well 14 with little or no rotation can be used.

The end face of the key head's stem 24 contacts an end of the spring 16 that is opposite the key well's back wall 26. The other end of the key head 18, which faces the housing's fastener receiving end 8, is provided with a key pattern 32 (best shown in FIG. 1). The key pattern 32 is shown by way of example only to be formed as a continuous raised curvilinear projection. However, it should be understood that the key pattern 32 could be implemented using any suitable male (or female) drive configuration that allows the key 2 to impart torque to a security fastener. For example, a continuous recessed curvilinear channel could be used for the key pattern 32. Non-continuous drive patterns could also be used, including but not limited to male (or female) pin configurations, slot configurations, star configurations, hexagonal configurations, square configurations, to name but a few.

Figure 2B:
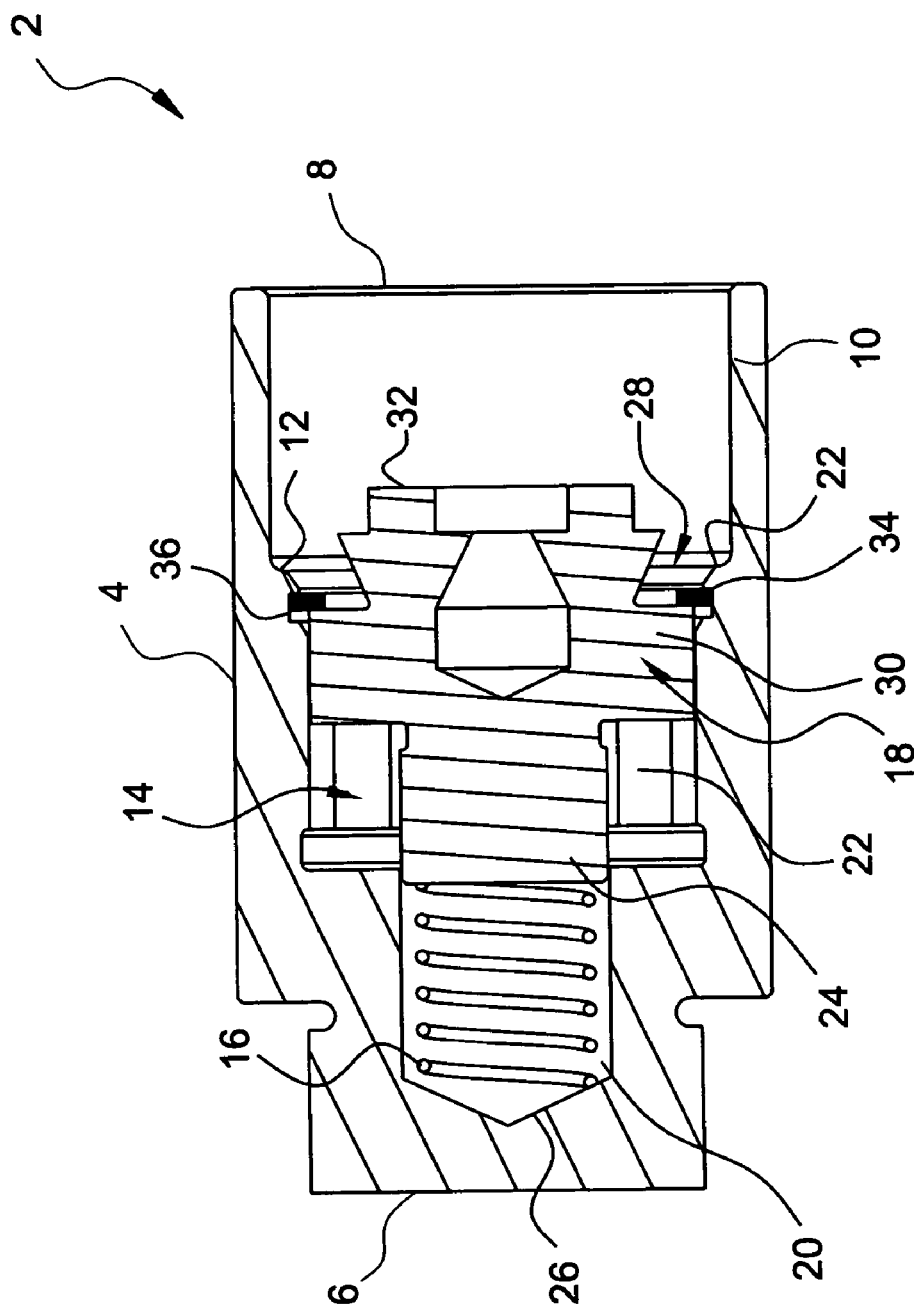
FIG. 2B is a cross-sectional centerline view of an alternative version of the key of FIG. 1.

The key head 18 can be retained within the key well 14 in several ways. FIG. 2A shows one exemplary alternative in which the ledge 12 is staked around the key head-receiving opening 28 in order to trap the key head by engaging its guide flange 30. FIG. 2B shows another construction in which the guide flange 30 is trapped by a retaining ring 34 seated in an annular groove 36 located adjacent to the key head-receiving opening 28.

Figure 3:
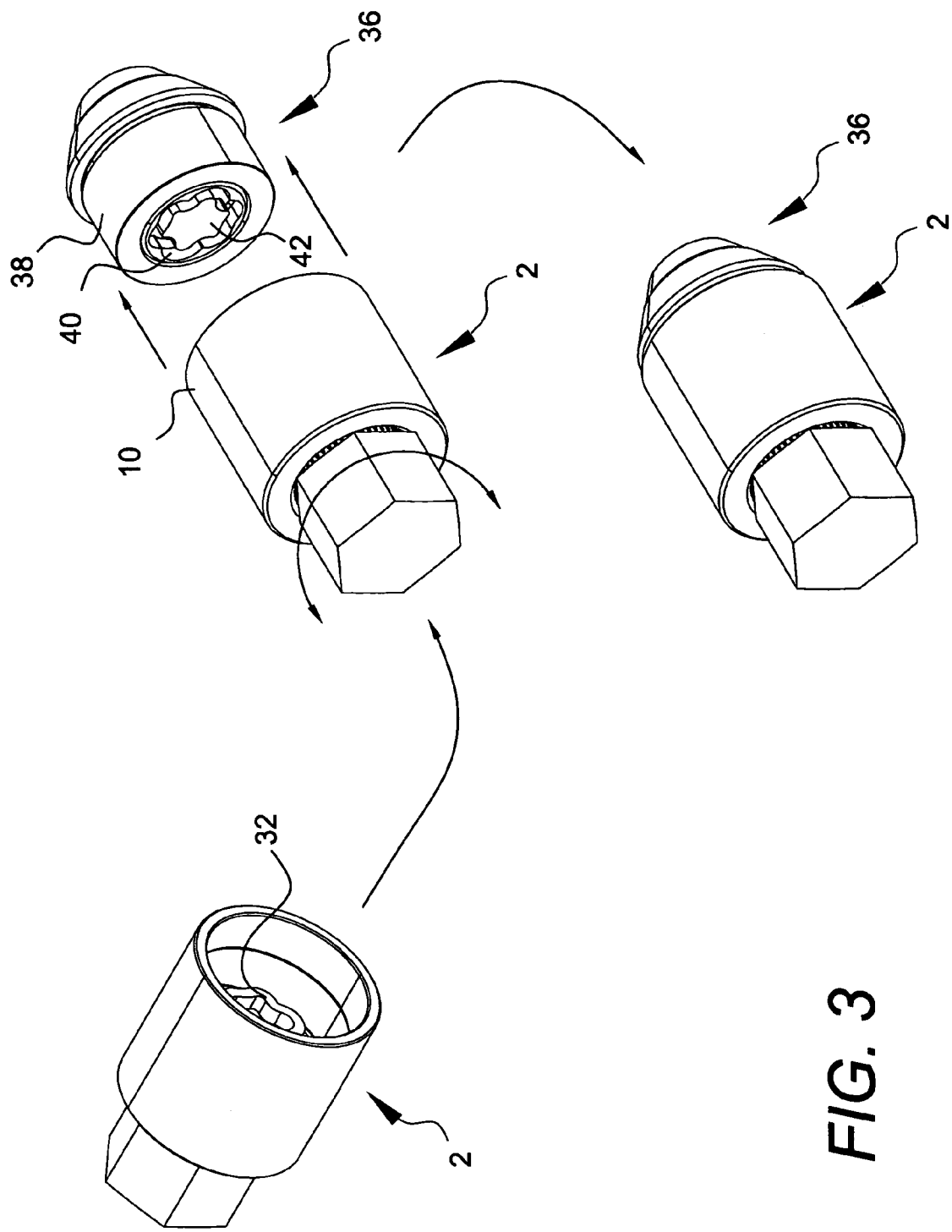
FIG. 3 is a composite perspective view showing the manipulation of the key of FIG. 1 into engagement with a security fastener having a matching lock pattern.
Figure 4A:
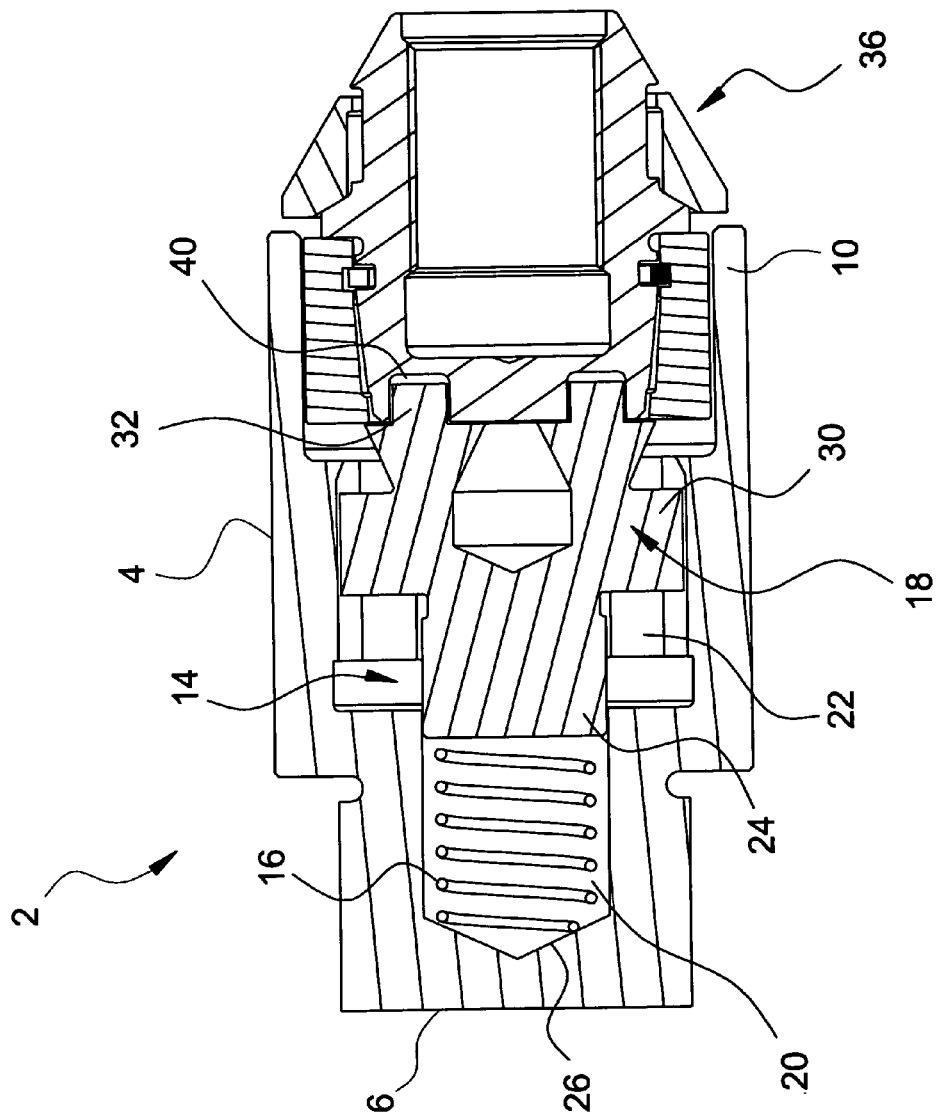
FIG. 4A is a cross-sectional centerline view of the key of FIG. 1 with its key pattern in an operational extension position in operational engagement with a security fastener having a matching lock pattern.
Figure 4B:
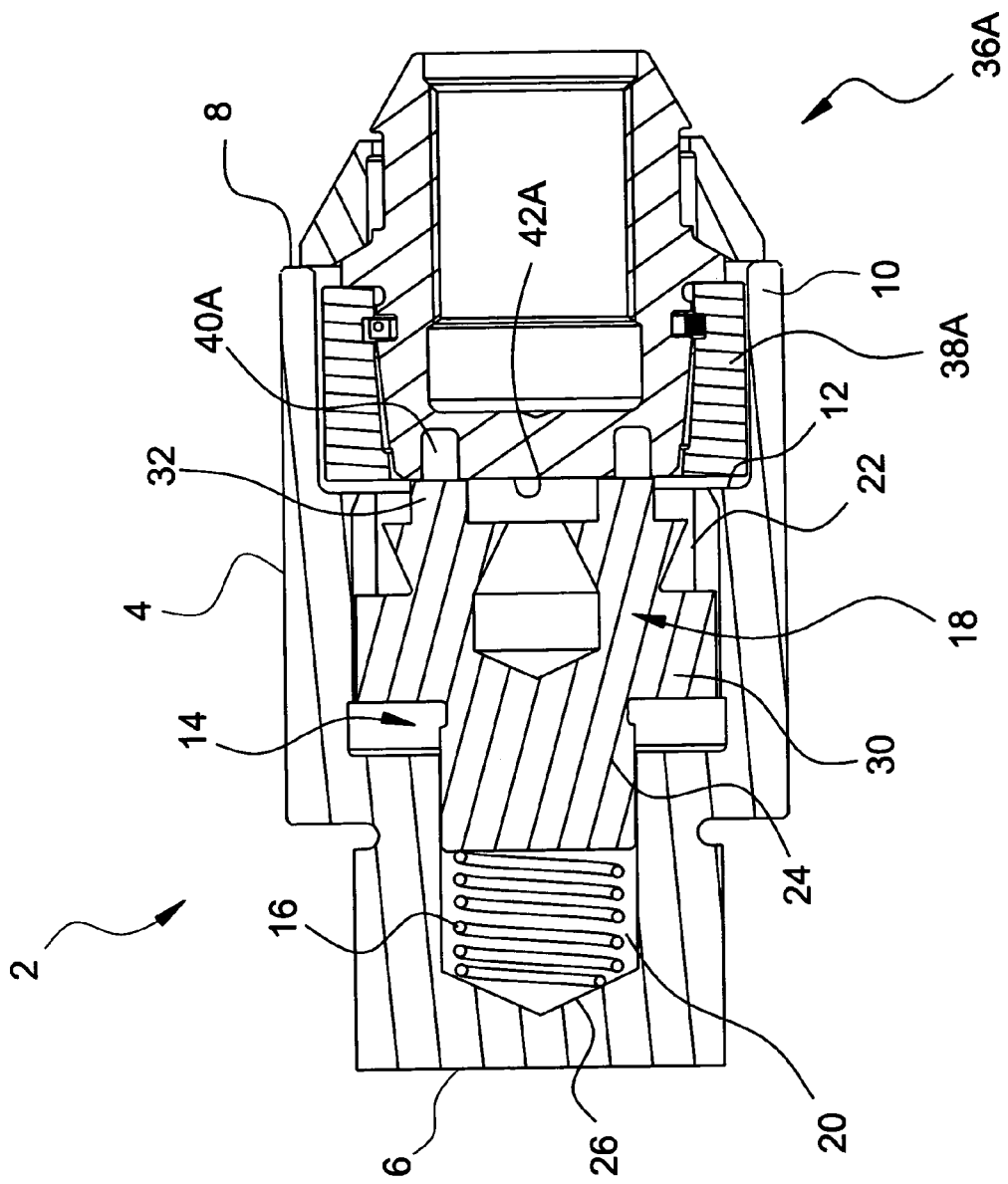
FIG. 4B is a cross-sectional centerline view of the key of FIG. 1 with its key pattern in a non-operational retraction position due to a tampering force applied by a security fastener having a non-matching lock pattern.

Turning now to FIGS. 3 and 4A–4B, the improved security features of the key 2 will now be described. Initially, the key head 18 is in an operational extension position in which the key pattern 32 is extended toward the housing's fastener-receiving end 8 by virtue of the spring 16. As shown in FIG. 3, the key 2 is maneuvered into alignment with the head of a security fastener 36 and advanced onto the fastener using the shroud 10 as a guide. As shown by the double-headed arrow in FIG. 3, slight rotation of the key 2 may be required to bring the key into proper operational alignment with the security fastener 36. The security fastener 36 can be of any desired type, including but not limited to a vehicular lug nut or lug bolt, a vehicular spare tire winch drive, etc. The security fastener 36 could also be a non-vehicular fastener.

Among the security features of the security fastener 36 of FIGS. 3 and 4A–4B is a tubular shroud 38 that freely spins relative to the remainder of the security fastener if an attempt is made to engage the shroud with a gripping tool. The security fastener 36 further includes a lock pattern 40 formed as a continuous curvilinear key receiving groove in the security fastener's generally planar end face 42. A raised curvilinear projection could also be used if the key pattern 32 is formed as a recessed curvilinear channel. Other lock pattern configurations will be required if other key pattern configurations are used. Note that in FIGS. 3 and 4A, the lock pattern 40 is assumed to match the key pattern 32. FIG. 4B shows the key 2 being used with a security fastener 36A having a non-matching lock pattern 40A.

As shown in FIG. 4A, because the lock pattern 40 is configured to mate with the key pattern 32, the key pattern in an operational extension position will substantially engage the lock pattern when the key 2 is advanced onto the security fastener 36, thereby allowing the security fastener to be operated by way rotation thereof under torque applied by the key. For example, if the security fastener 36 is a vehicular lug nut or lug bolt, the key 2 can be used to turn the security fastener into and out of locking engagement in a vehicle wheel installation in which a vehicle wheel (not shown) is secured to a hub or other mounting structure (not shown).

In FIG. 4B, it is assumed that an attempt has been made to use the key 2 on a security fastener 36A whose lock pattern 40A is not configured to mate with the key pattern 32. In that case, the key pattern 32 in an operational extension position will not engage the lock pattern 40A and the non-matching security fastener 36A cannot be operated by the key 2. If an attempt is made to jam the key 2 onto the non-matching security fastener 36A by applying an excessive tampering force (e.g., due to a hammer blow delivered to the base 6 of the key 2), the tampering force will be reacted by the immovable end face 42A of the security fastener against the key pattern 32. This tampering force will tend to urge the key head 18 toward the back wall 26 of the key well 14 against the biasing force of the spring 16. This means that the key pattern 32 cannot be forced into engagement with the non-matching security fastener 36A. Instead of being able to gain a purchase on the security fastener 36A as a result of the tampering force, the key pattern 32 will simply retract toward the key well 14 into a non-operational retraction position. As this occurs, the spring 16 will act as a retraction control member that controls retraction of the key pattern 32 according to the amount of tampering force that is applied. Note that the spring 16 will return the key pattern 32 to an operational extension position once the tampering force is removed. Thus, the non-operational retraction position is only temporary in the first exemplary key construction represented by the key 2.

It will be appreciated that the spring 16 should be designed so that forces associated with normal use of the key 2 to operate an authorized matching security fastener will not appreciably deflect the spring. However, the spring 16 should yield under the higher tampering force. Implementing the spring 16 as a helical coil made from steel stock of suitable gauge thickness will allow the key 2 to operate in the manner described above. It should further be understood that other spring designs may likewise be used to provide the biasing force needed for the key head retraction control function, including but not limited to Belleville spring washers as well as other biasing elements made from deformable resilient materials such as compressible rubber or the like. Resilient cushions, such as gas-filled bladders, could also be used.

As an additional security measure, a stop surface can be associated with the key housing 4 to contact an area of the non-matching security fastener 36A as the key pattern 32 retracts. This will prevent the security fastener's non-matching lock pattern 40A from following the key pattern 32 to its retraction limit wherein the key head 18 bottoms out in the key well 14. The stop surface may reside at various locations on the key 2 depending on the geometry of the key and the size and shape of the non-matching security fastener 36A. For example, as shown in FIG. 4B, a stop surface may be provided by the housing's fastener receiving end 8 if the shroud 10 is present and is of sufficient length to engage a corresponding surface of the non-matching security fastener 36A during retraction of the key pattern 32. In FIG. 4B, this corresponding surface is located on the front face of a tapered seat member of the non-matching security fastener 36A. If the shroud 10 is not present, or is of reduced length, or if the security fastener 36A has no surface to contact the shroud, the ledge 12 of the housing 4 can act as a stop surface that engages (for example) the forward end face of the non-matching security fastener's tubular shroud 38A as the key pattern 32 retracts. In some cases, the fastener receiving end 8 and the ledge 12 of the key 2 could both act as stop surfaces in different situations depending on the type of non-matching security fastener being contacted by the key. As such, some key constructions may provide plural application-specific stop surfaces. Alternatively, it may be the case that neither the fastener receiving end 8 nor the ledge 12 engages any portion of a security fastener, in which case some other surface (such as a prong or a tang on the shroud 10) may be provided to perform this function.

II. Second Exemplary Key Construction

Figure 5:
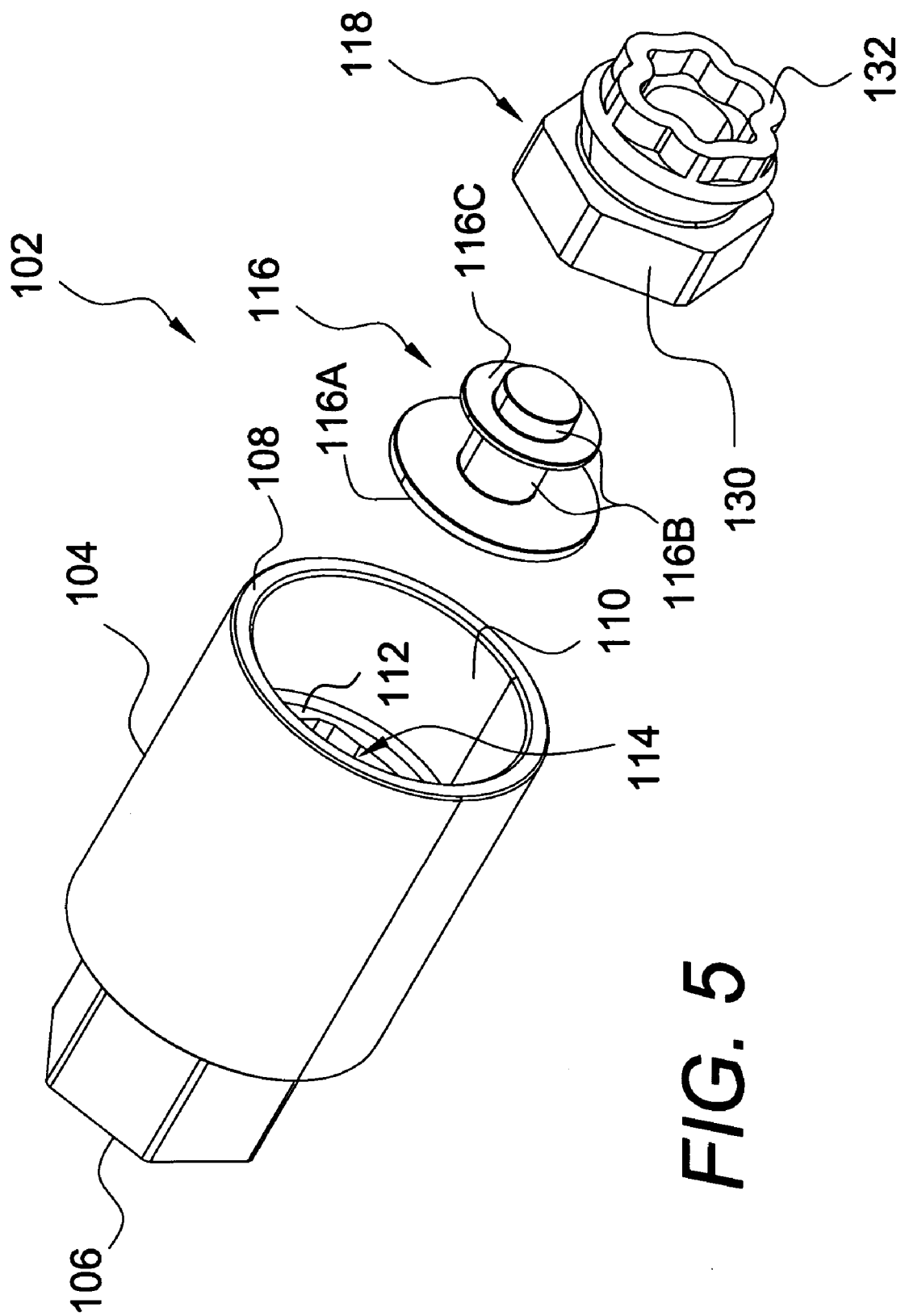
FIG. 5 an exploded perspective view of a second exemplary key construction in accordance with the invention.
Figure 6A:
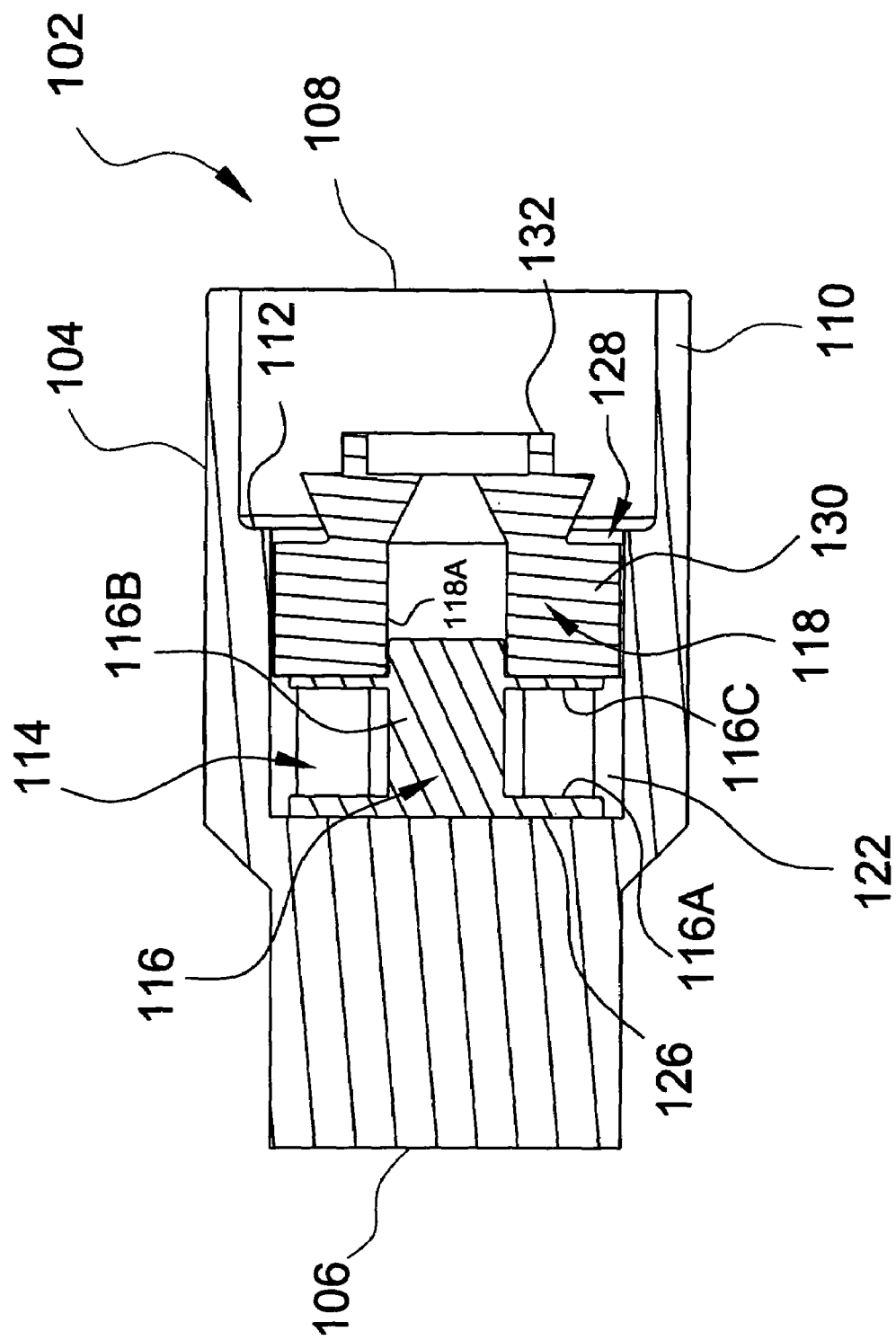
FIG. 6A is a cross-sectional centerline view of the key of FIG. 5 with its key pattern in an operational extension position.
Figure 6B:
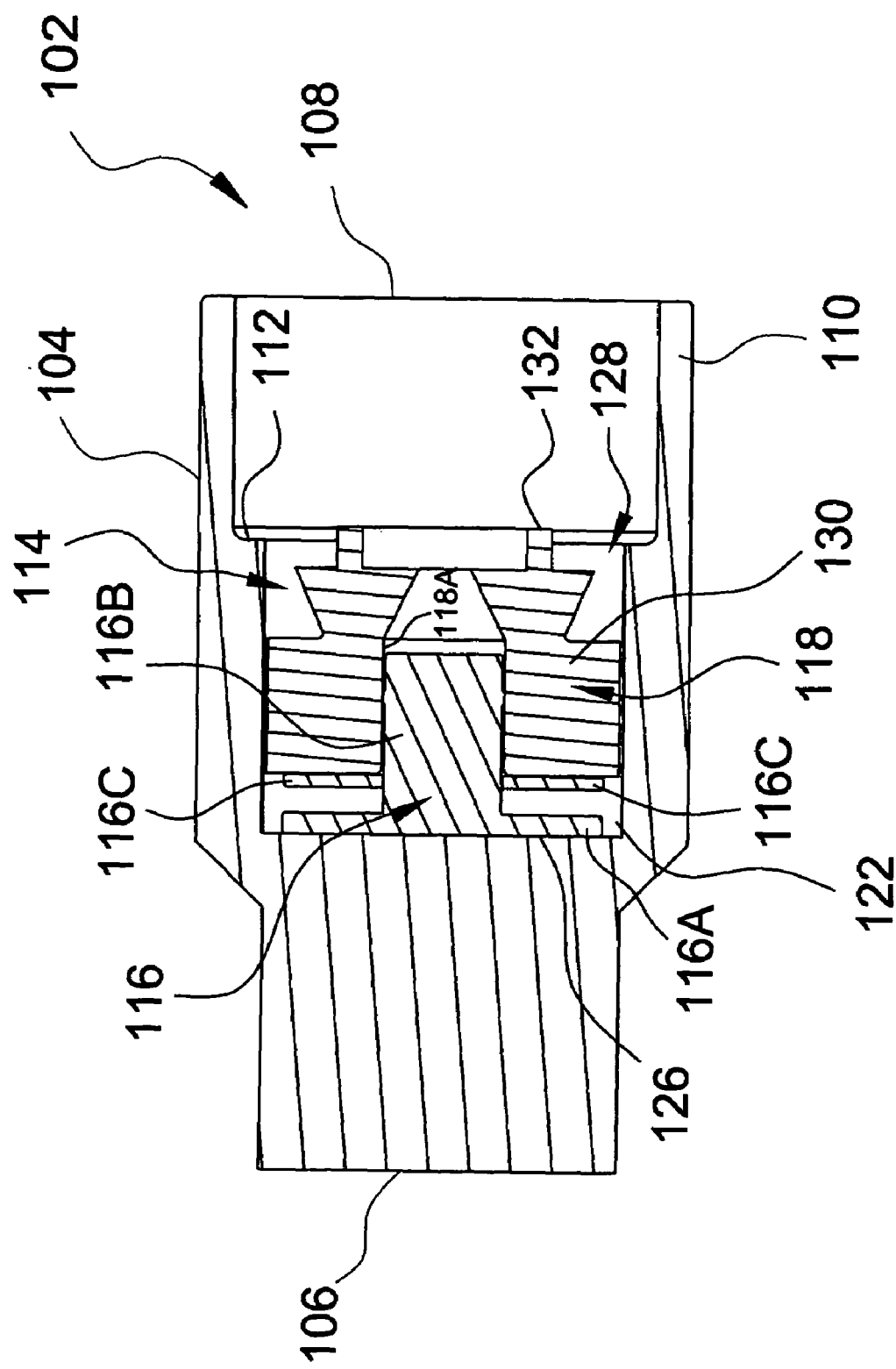
FIG. 6B is a cross-sectional centerline view of the key of FIG. 5 with its key pattern in a non-operational retraction position.

Turning now to FIGS. 5, 6A and 6B, a key 102 according to a second exemplary key construction of the invention is similar in many respects to the key 2 of the first exemplary key construction, as indicated by the use of corresponding reference numbers incremented by a value of 100. The primary difference between the key 202 and the key 2 is that the former does not use the spring 16 as a retraction control member. Instead, the spring 16 is replaced with a breakable element 116 made from plastic (e.g., ST801 type 6/6 polyamide nylon or the like) or other readily breakable material, such as soft metal, etc. In addition, the housing 104 is modified such that the key well 114 comprises only a primary guide way 122 of hexagonal cross-sectional shape. It does not include a separate bore such as the bore 20 in the key housing 4 described above. The key head 118 is also modified insofar as it lacks a stem.

As shown in FIG. 6A, the breakable element 116 is formed with a disk-shaped base flange 116A that rests against the back wall 126 of the key well 114. Extending from the base flange 116A is a central post 116B that is sized to mate with a central longitudinal bore 118A formed in the key head 118. A thin, disk-shaped key pattern support flange 116C is mounted on the post 116B in spaced relation to the base flange 116A. The support flange 116C engages a base end of the key head to limit the distance that the post 116B penetrates into the bore 118A. The breakable element 116 thus acts as a retraction control member that maintains the key pattern 132 in an operational extension position until a tampering force is applied. More particularly, the thickness of the support flange 116C is controlled to shear, rip, rupture or tear from the post 116B, and/or to bend or fold, when a desired breakaway force is applied. It will be appreciated that a higher breakaway force can be obtained by increasing the thickness of the support flange 116C, and visa versa.

In FIG. 6B, it is assumed that a tampering force has been applied to the key pattern 132, and that the support flange 116C has sheared at its point of connection to the post 116B. This allows the post 116B to advance into the bore 118A, enabling the key head 118 to slide toward the back of the key well 114. The key pattern 132 will thereby retract to a non-operational retraction position. Note that because the breakable element 116 is used in lieu of a biasing element, the key pattern 132 will tend to remain in a retraction position after the tampering force is removed, rendering the key 102 inoperable even for authorized use with a matching security fastener.

III. Third Exemplary Key Construction

Figure 7:
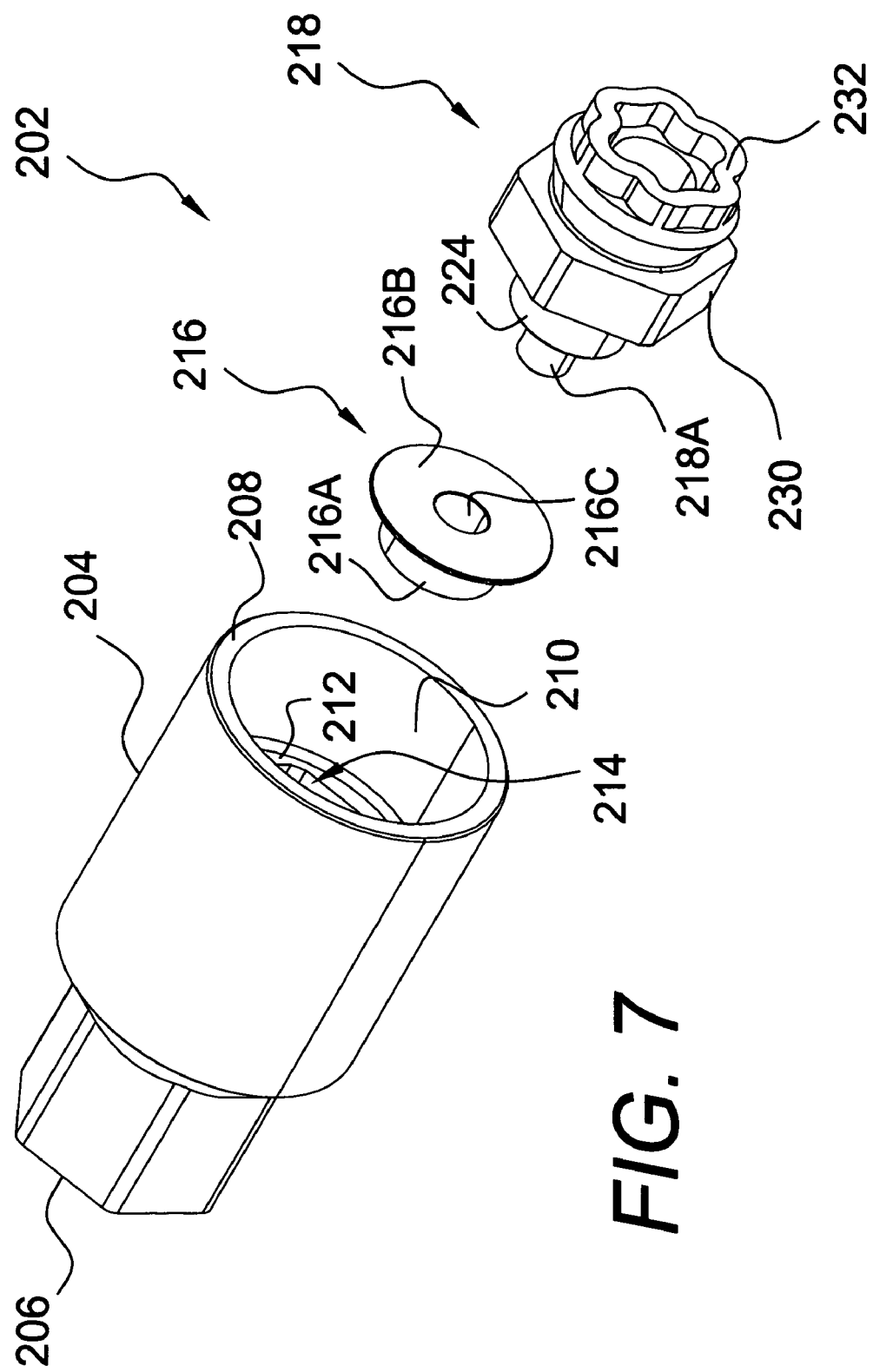
FIG. 7 is an exploded perspective view of a third exemplary key construction in accordance with the invention.
Figure 8A:
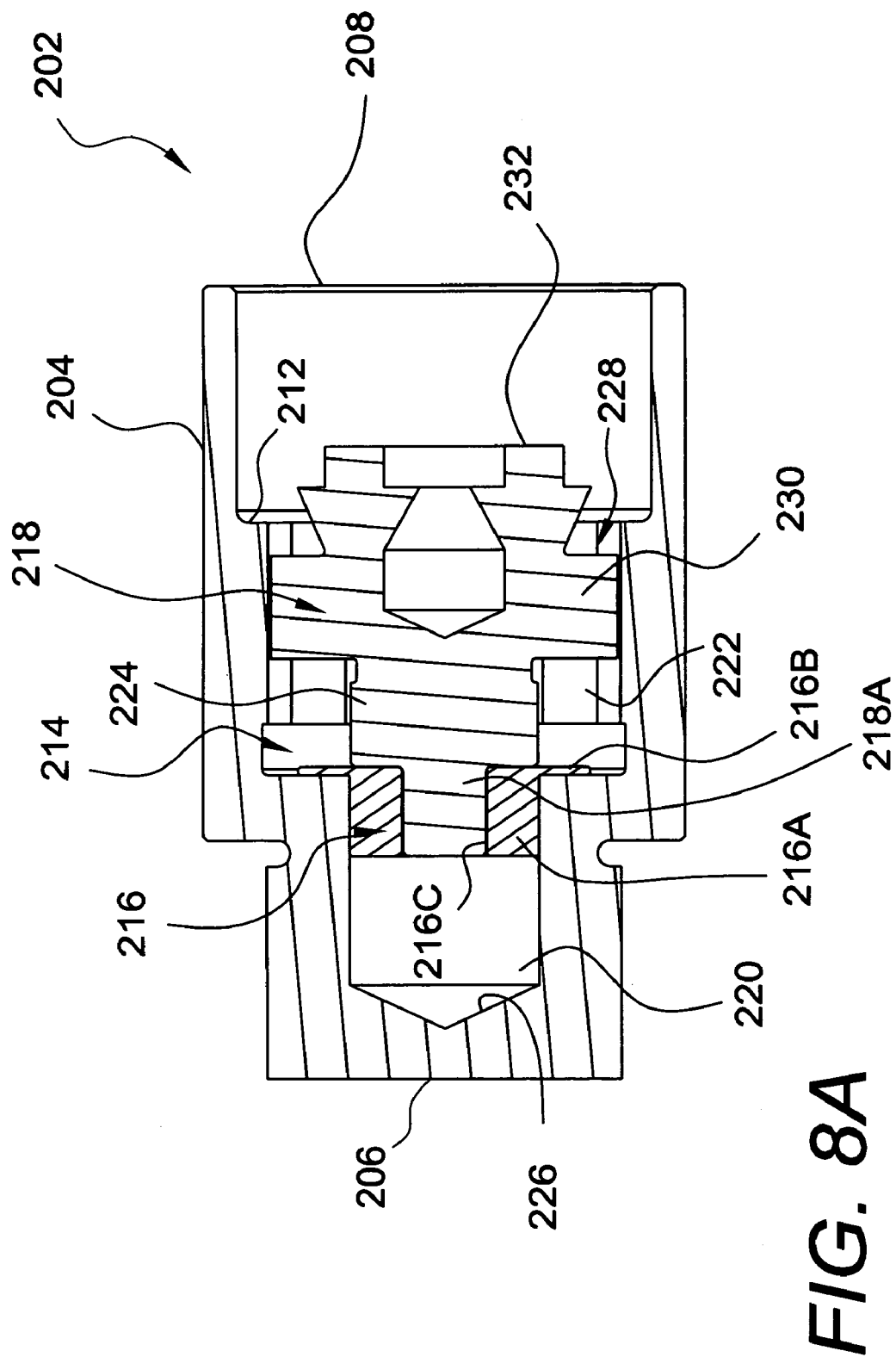
FIG. 8A is a cross-sectional centerline view of the key of FIG. 7 with its key pattern in an operational extension position.
Figure 8B:
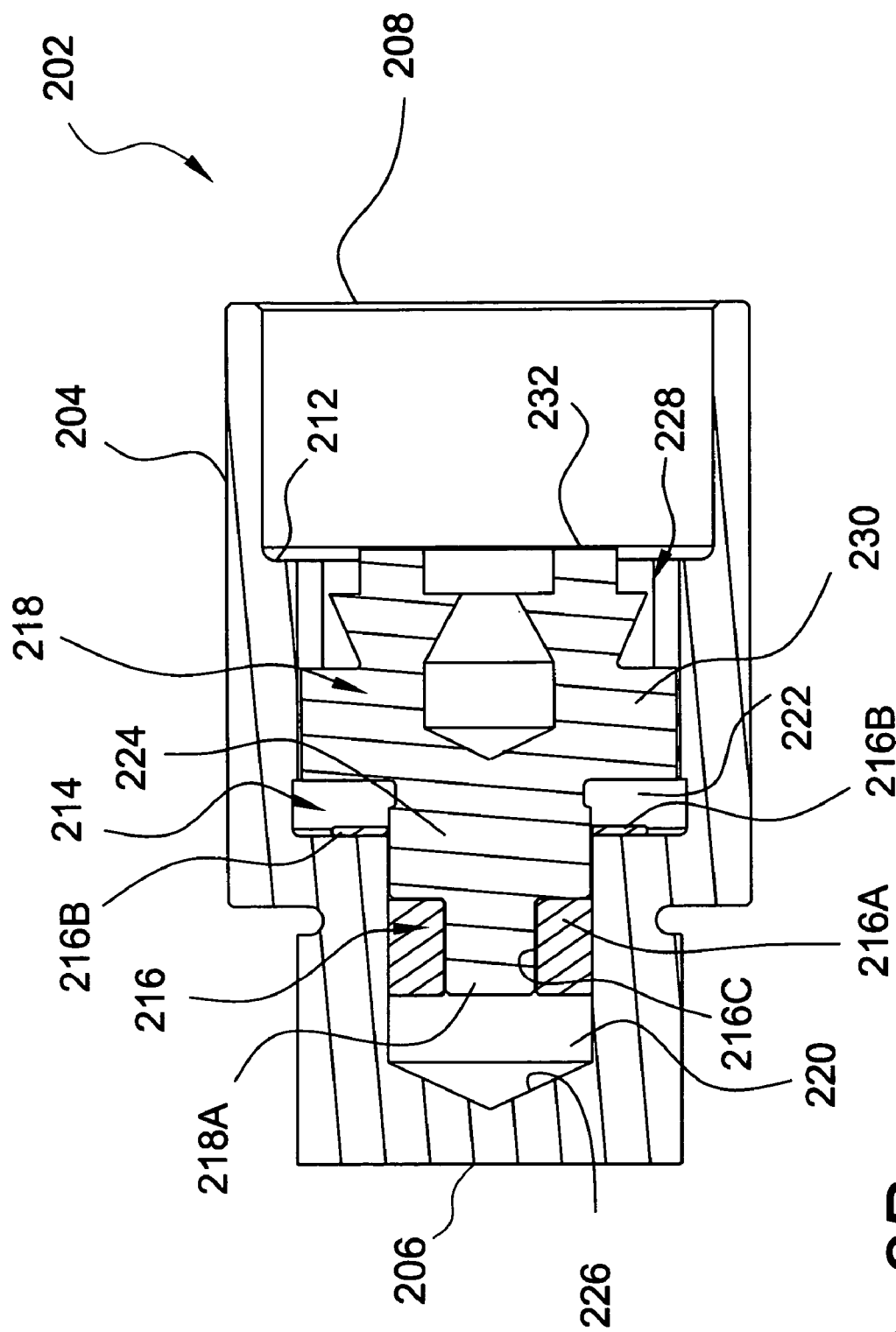
FIG. 8B is a cross-sectional centerline view of the key of FIG. 7 with its key pattern in a non-operational retraction position.

Turning now to FIGS. 7, 8A and 8B, a key 202 according to a third exemplary key construction of the invention is similar in many respects to the key 102 of the second exemplary key construction, as indicated by the use of corresponding reference numbers incremented by a value of 100. The primary difference between the key 202 and the key 102 is in the design of the retraction control member. In particular, a modified breakable element 216, made from plastic (e.g., ST801 type 6/6 polyamide nylon or the like) or other readily breakable material, such as soft metal, etc., is used in lieu of the breakable element 116 described above. The housing 204 is the same design used for the housing 4 of the first exemplary key construction. The key well 214 of the housing 204 thus includes both a bore 220 and a main guide way 222. The key head 218 is similar to the key head 18 of the first exemplary key construction, except that it includes a post 218A extending from the stem 224.

As shown in FIG. 8A, the breakable element 216 is formed with a main bushing 216A that is sized to slideably engage the sides of the key well bore 220. A thin, disk-shaped key pattern support flange 216B is mounted on the end of the main bushing 216A that faces the key well's main guide way 222. The support flange 216B engages the back of the key well's main guide way 222. A central bore 216C in the breakable element 216 extends through the main bushing 216A (or at least a portion thereof). The central bore 216C is sized to receive the key head's post 218A. The breakable element 216 thus acts as a retraction control member that maintains the key pattern 232 in an operational extension position until a tampering force is applied. More particularly, the thickness of the support flange 216B is controlled to shear, rip, rupture or tear from the main bushing 216A, and/or to bend or fold, when a desired breakaway force is applied. It will be appreciated that a higher breakaway force can be obtained by increasing the thickness of the support flange 216B, and visa versa.

In FIG. 8B, it is assumed that a tampering force has been applied to the key pattern 232, and that the support flange 216B has sheared at its point of connection to the main bushing 216A. This will allow the main bushing 216A to retreat deeper into key well's bore 220, enabling the key head 218 to slide toward the back of the key well 214. The key pattern 232 will thereby retract to a non-operational retraction position. Note that because the breakable element 216 is used in lieu of a biasing element, the key pattern 232 will tend to remain in a retraction position after the tampering force is removed, rendering the key 202 inoperable even for authorized use with a matching security fastener.

IV. Fourth Exemplary Key Construction

Figure 9:
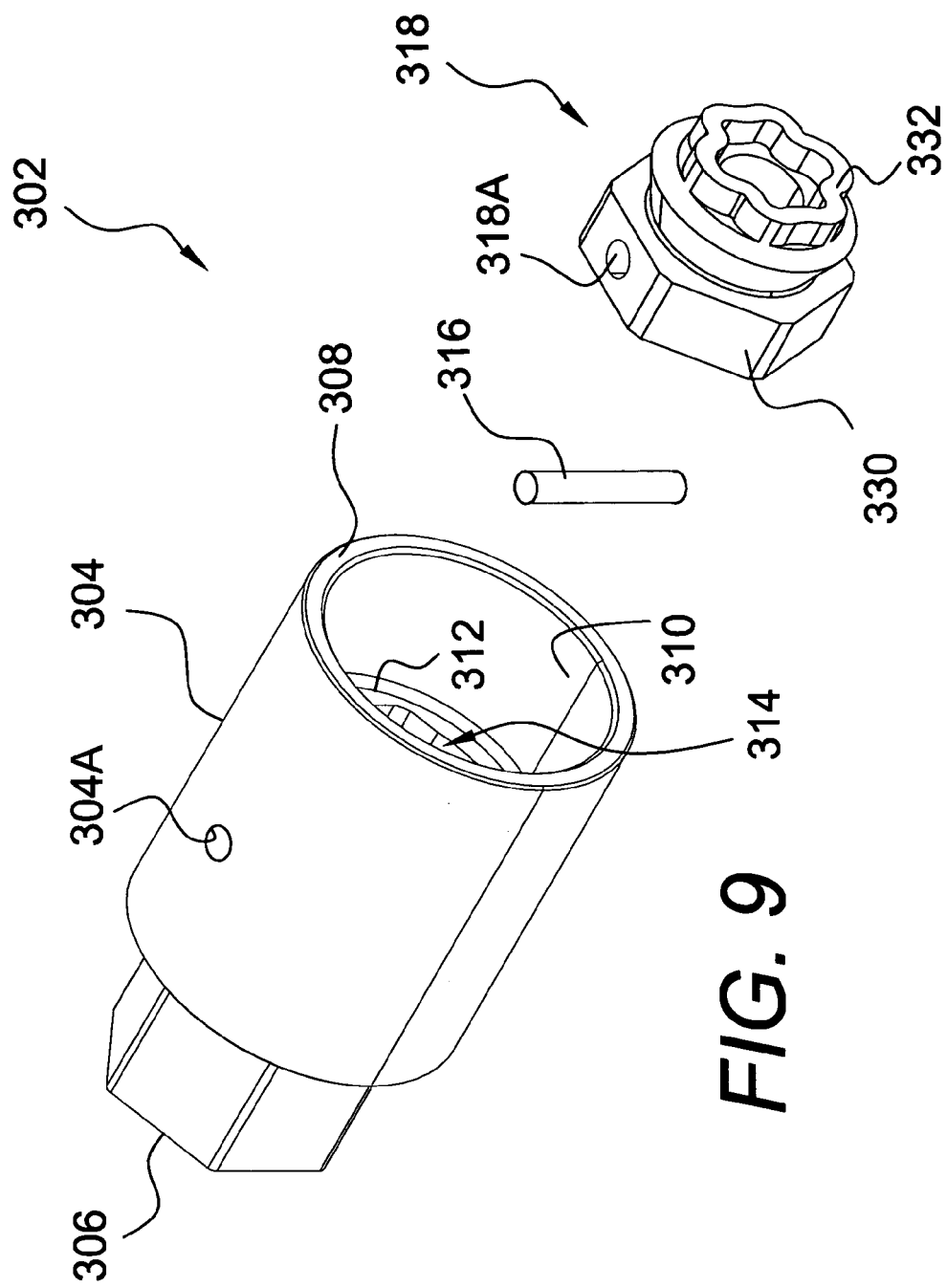
FIG. 9 is an exploded perspective view of a fourth exemplary key construction in accordance with the invention.
Figure 10A:
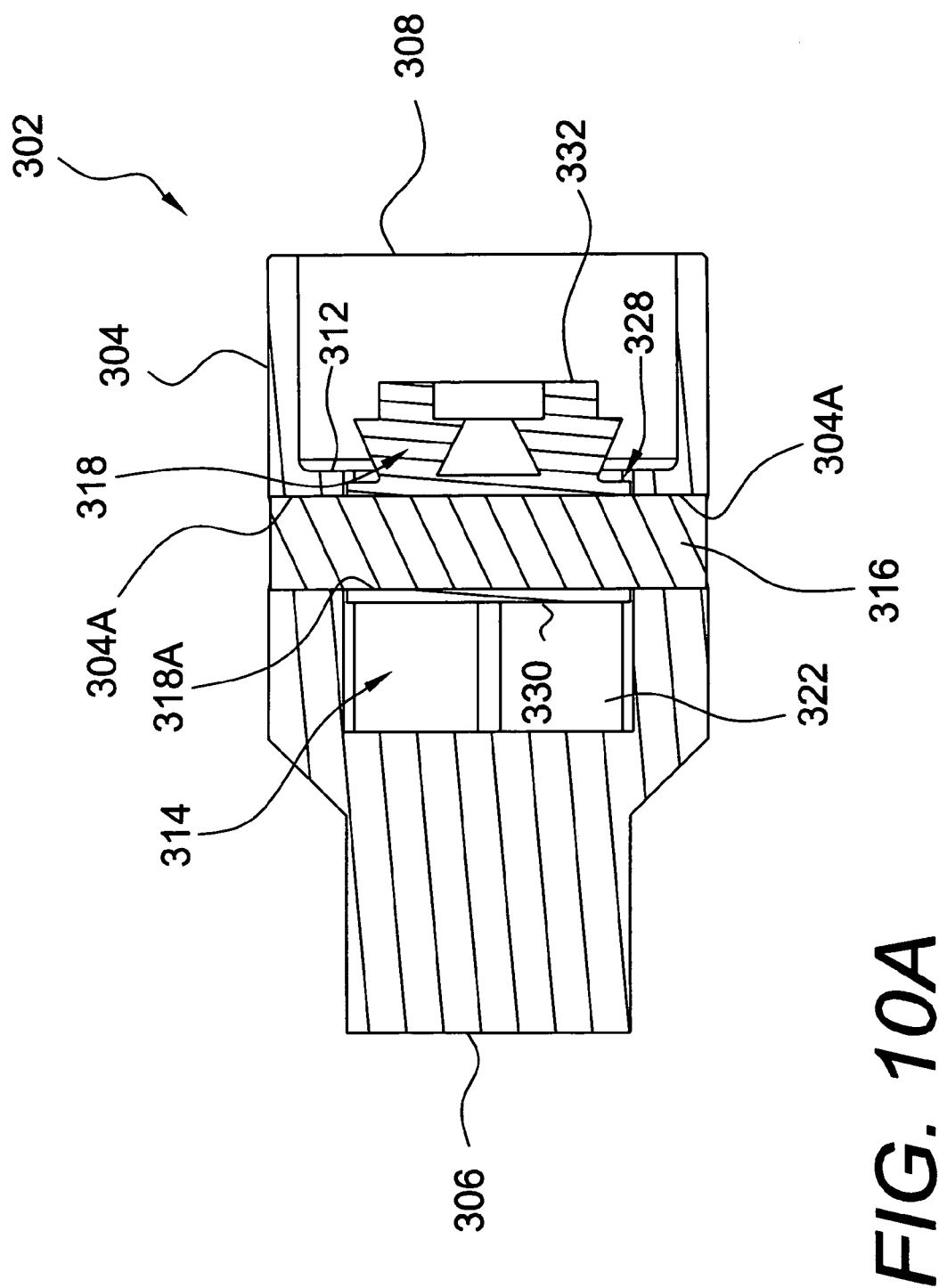
FIG. 10A is a cross-sectional centerline view of the key of FIG. 9 with its key pattern in an operational extension position.
Figure 10B:
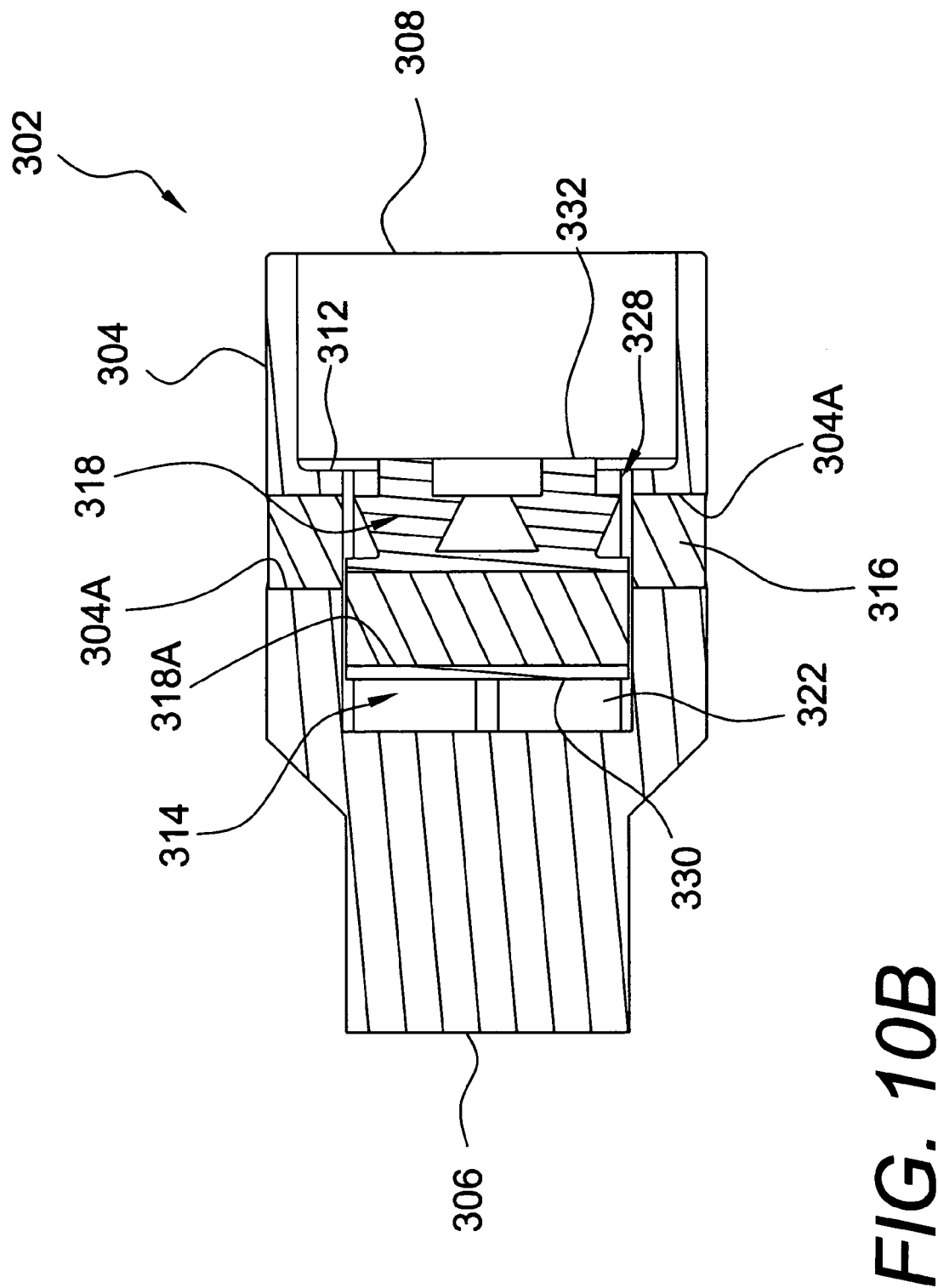
FIG. 10B is a cross-sectional centerline view of the key of FIG. 9 with its key pattern in a non-operational retraction position.

Turning now to FIGS. 9, 10A and 10B, a key 302 according to a fourth exemplary key construction of the invention is similar in many respects to the key 202 of the third exemplary key construction, as indicated by the use of corresponding reference numbers incremented by a value of 100. The primary difference between the key 302 and the key 202 is in the design of the retraction control member. In particular, a modified breakable element 316 in the form of a pin, made from plastic (e.g., ST801 type 6/6 polyamide nylon or the like) or other readily breakable material, such as soft metal, etc., is used in lieu of the breakable element 216 described above. The housing 304 is the same design used for the housing 104 of the second exemplary key construction, except that there are a pair of opposing pin-receiving holes 304A formed in the sides of the key well 314. The key head 318 is similar to the key head 118 of the second exemplary key construction, except that there is no longitudinal bore. Instead, a transverse bore 318A can be provided to extend laterally through the key head's guide flange 330.

As shown in FIG. 10A, the breakable element 316 is formed as a pin that extends through the holes 304A in the key housing 304 and which may also extend through the key head bore 318A, if present. Alternatively, the breakable element 316 could be located behind the key head's guide flange 330, in which case the key head bore 318A is not required. The breakable element 316 acts as a retraction control member that maintains the key pattern 332 in an operational extension position until a tampering force is applied. More particularly, the thickness of the breakable element 316 is controlled to shear, rip, rupture or tear, and/or to bend or fold, in two places on opposite sides of the key head 318 (i.e., at the location of the holes 304A) when a desired breakaway force is applied. It will be appreciated that a higher breakaway force can be obtained by increasing the thickness of the breakable element 316, and visa versa.

In FIG. 10B, it is assumed that a tampering force has been applied to the key pattern 332, and that the breakable element 316 has sheared in the manner described above. This will allow the key head 318 to slide toward the back of the key well 314. The key pattern 332 will thereby retract to a non-operational retraction position. Note that because the breakable element 316 is used in lieu of a biasing element, the key pattern 332 will tend to remain in a retraction position after the tampering force is removed, rendering the key 302 inoperable even for authorized use with a matching security fastener.

V. Fifth Exemplary Key Construction

Figure 11:
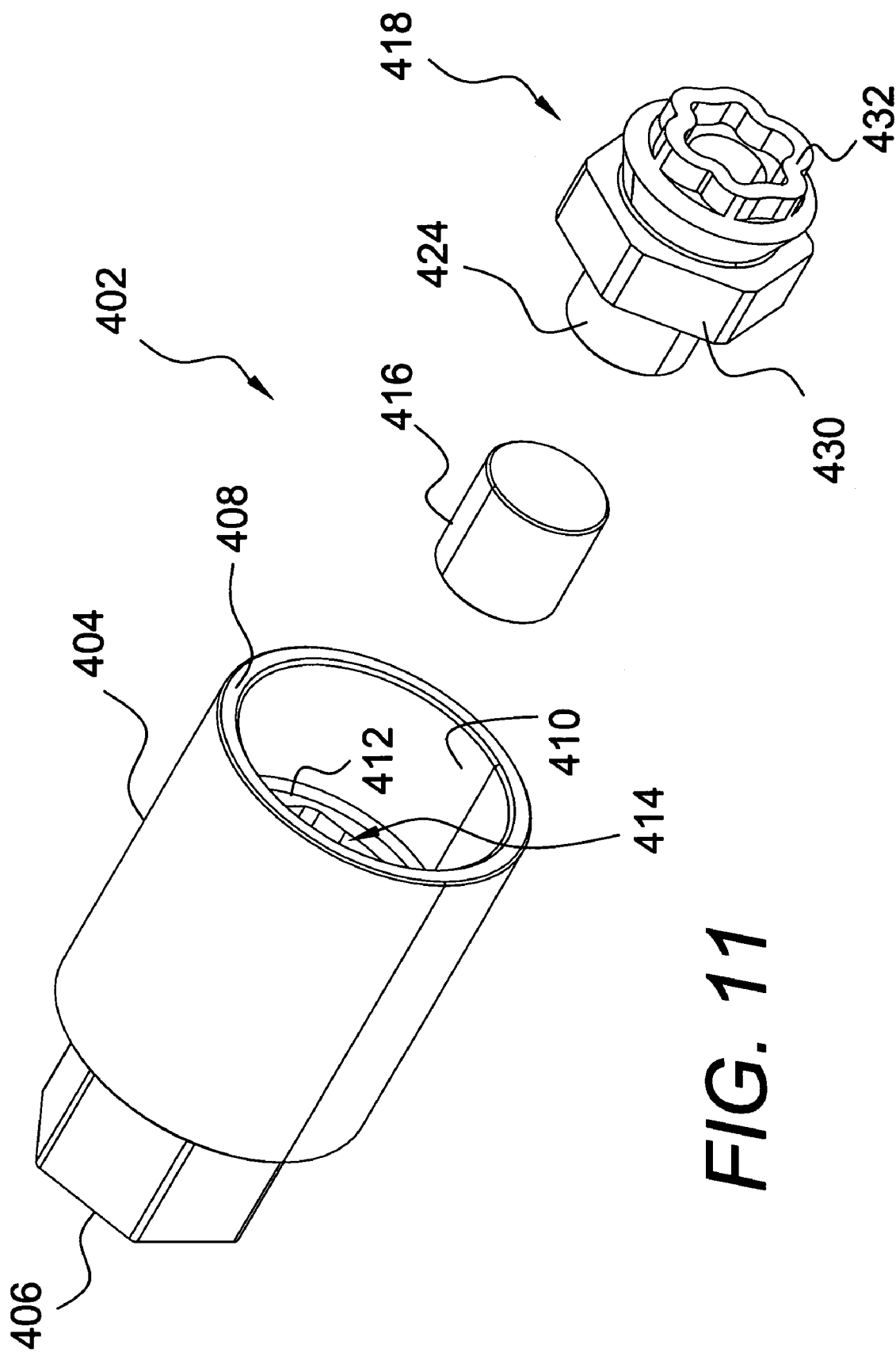
FIG. 11 is an exploded perspective view of a fifth exemplary key construction in accordance with the invention.
Figure 12B:
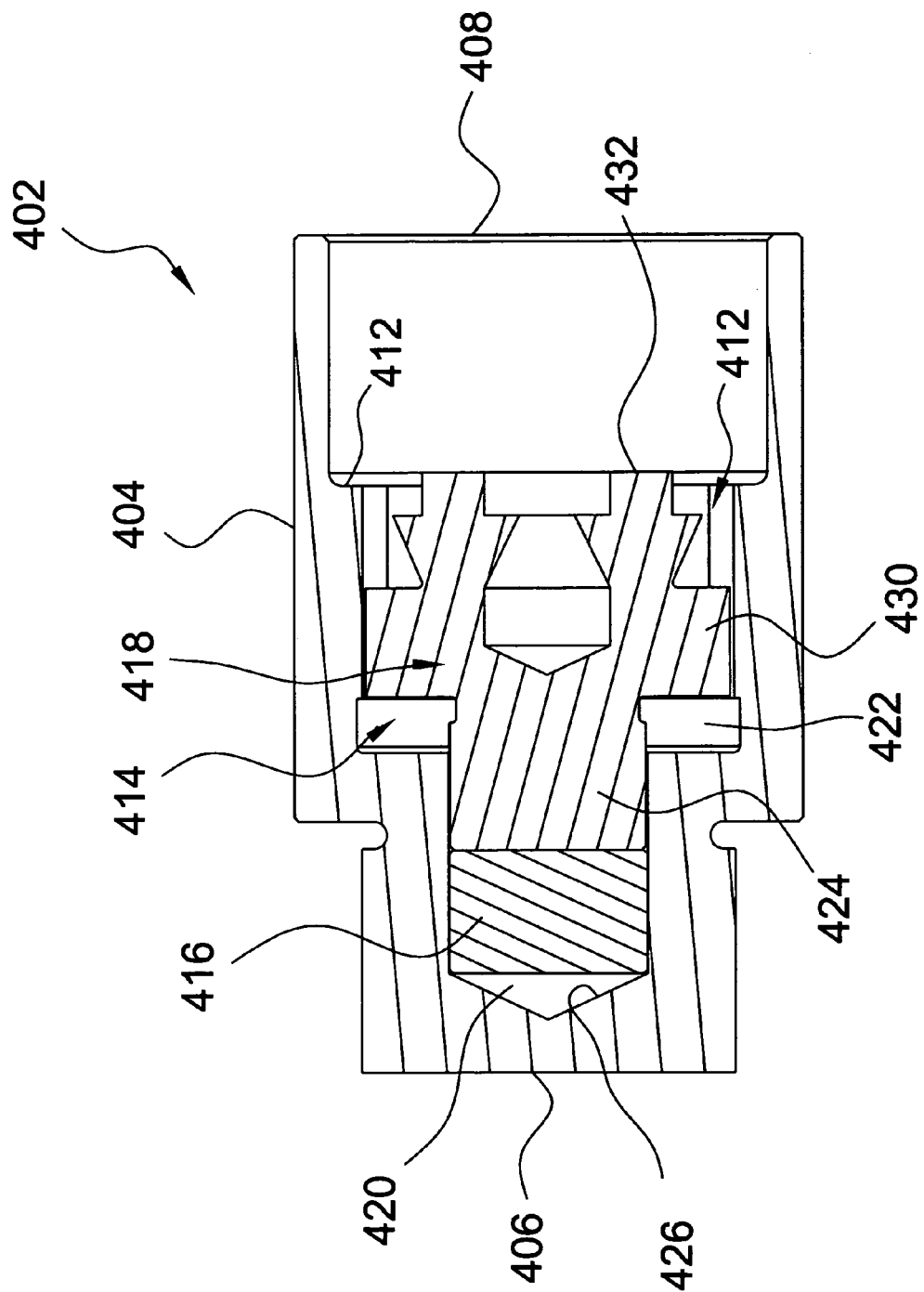
FIG. 12B is a cross-sectional centerline view of the key of FIG. 11 with its key pattern in a non-operational retraction position.

Turning now to FIGS. 11, 12A and 12B, a key 402 according to a fifth exemplary key construction of the invention is similar in many respects to the key 302 of the second exemplary key construction, as indicated by the use of corresponding reference numbers incremented by a value of 100. The primary difference between the key 402 and the key 302 is in the design of the retraction control member. In particular, a crushable element 416, made from a relatively rigid yet collapsible foam, or other readily crushable material, is used in lieu of a breakable element. The housing 404 is the same design used for the housing 4 of the first exemplary key construction. The key well 414 of the housing 404 thus includes both a bore 420 and a main guide way 422. The key head 418 is the same design used for the key head 18 of the first exemplary key construction, and thus includes a stem 424.

As shown in FIG. 12A, the crushable element 416 is shaped as a cylinder and resides within the key well's bore 420. One end of the crushable element 416 is seated against the key well's back wall 426. The other end of the crushable element 416 bears against the end face of the key head's stem 424 and supports the key head 418 against slideable movement toward the back of the key well 414. The crushable element 416 thus acts as a retraction control member that maintains the key pattern 432 in an operational extension position until a tampering force is applied.

As shown in FIG. 12B, when a tampering force is applied to the key pattern 432, the crushable element 416 will collapse within the bore 420. This will allow the key head 418 to slide toward the back of the key well 414. The key pattern 432 will thereby retract to a non-operational retraction position. Note that because the crushable element 416 is used in lieu of a biasing element, the key pattern 432 will tend to remain in a retraction position after the tampering force is removed, rendering the key 402 inoperable even for authorized use with a matching security fastener.

Accordingly, a key with a retractable key pattern has been shown and described according to several exemplary constructions. While various embodiments have been disclosed, many other variations would also be possible within the scope of the invention. For example, although various designs for implementing a retraction control function have been set forth, it should be apparent to persons skilled in the art in light of the teachings herein that there are innumerable design alternatives that could also be used. Examples include but are not limited to the use of retention elements that operate along the sides of the key well, such as ball detent mechanisms, deformable or breakable retaining rings or bushings, and flanges that are either separately attached or integrally formed on the key head or the key well, etc. Another design approach would be to establish an interference fit between the key head and the sides of the key well. Obtaining a proper interference fit with the required breakaway force could be aided by providing knurling on the key head or the key well, providing a deformable bushing between the key head and the key well, or by forming the stem of the key head as a slotted tube that is compressed by the key well side walls (or by an insert in the key well). Tapering the key well side walls or forming a chamfer therein (or providing a tapered or chamfered insert in the key well) could be used to apply a compressive force on the key head that increases as the key pattern retracts.

In view of these and many other potential alternative design possibilities, it should be understood that the invention is not to be in any way limited except in accordance with the spirit of the appended claims and their equivalents.

What is claimed is:

1. A key for operating a security fastener having a lock pattern, said key comprising
    a housing having a base end and an open fastener receiving end;
    a torque-receiving configuration associated with said housing base end, said torque-receiving configuration being adapted to transfer rotational torque from a torquing source to said housing;
    a key well in said housing;
    a retractable key pattern slideably disposed in said key well;
    a torque-transfer configuration between said key well and said retractable key pattern, said torque-transfer configuration being adapted to transfer rotational torque imparted by said torquing source to said housing from said housing to said retractable key pattern; and
    said retractable key pattern having an operational extension position in which said key pattern is enabled for substantial engagement with a security fastener having a matching lock pattern, thereby allowing operation of the matching security fastener, and a non-operational retraction position in which said key pattern is not capable of substantial engagement with a security fastener having a non-matching lock pattern, thereby preventing operation of the non-matching security fastener.

2. A key in accordance with claim 1 further including a retraction control member adapted to resist movement of said key pattern from said extension position to said retraction position until a tampering force in excess of a normal operational force is applied to said key pattern.

3. A key in accordance with claim 2 wherein said retraction control member comprises a biasing element.

4. A key in accordance with claim 3 wherein said biasing element comprises a spring.

5. A key in accordance with claim 3 wherein said biasing element comprises a deformable resilient material.

6. A key in accordance with claim 2 wherein said retraction control member comprises a breakable element.

7. A key in accordance with claim 6 wherein said breakable element comprises a breakable key pattern support flange.

8. A key in accordance with claim 6 wherein said breakable element comprises a breakable key pattern support pin.

9. A key in accordance with claim 2 wherein said retraction control member comprises a crushable element.

10. A key in accordance with claim 2 wherein said retraction control member is adapted to return said key pattern from said retraction position to said extension position after said tampering force is removed.

11. A key in accordance with claim 1 further including a stop surface adapted to contact a surface of a non-matching security fastener as said key pattern retracts to said retraction position.

12. A key in accordance with claim 1 wherein said key pattern is configured for use with a vehicular security fastener.

13. A key in accordance with claim 1 wherein said key pattern is configured for use with a non-vehicular security fastener.

14. A key in accordance with claim 1 wherein said key pattern comprises one of a male or female, continuous or non-continuous, curvilinear or non-curvilinear pattern or drive configuration.

15. A key for operating a security fastener having a lock pattern, said key comprising:
    a housing;
    a base end and an open fastener-receiving end on said housing;
    a key well in said housing;
    a key head slidably disposed in said key well;
    a key pattern on one end of said key head;
    an opposite end of said key head having an end face that faces said housing base end and being free of torque-receiving shank structure extending beyond said housing base end; and
    said key pattern being retractable by virtue of slideable movement of said key head in said key well between an operational extension position in which said key pattern is enabled for substantial engagement with a security fastener having a matching lock pattern, thereby allowing operation of the matching security fastener, and a non-operational retraction position in which said key pattern is not capable of substantial engagement with a security fastener having a non-matching lock pattern, thereby preventing operation of the non-matching security fastener.

16. A key in accordance with claim 15 further including a retraction control member adapted to resist movement of said key pattern from said extension position to said retraction position until a tampering force in excess of a normal operational force is applied to said key pattern.

17. A key in accordance with claim 16 wherein said retraction control member comprises a biasing element disposed between said key well and said key head.

18. A key in accordance with claim 17 wherein said biasing element comprises a spring.

19. A key in accordance with claim 17 wherein said biasing element comprises a deformable resilient material.

20. A key in accordance with claim 16 wherein said retraction control member comprises a breakable element disposed between said key well and said key head.

21. A key in accordance with claim 20 wherein said breakable element comprises a breakable key pattern support flange.

22. A key in accordance with claim 21 wherein said breakable element comprises a post that extends into an opening in said key head, said key head being adapted to slide on said post while said key pattern moves to said retraction position after said support flange is broken or otherwise compromised.

23. A key in accordance with claim 21 wherein said breakable element comprises a bushing that mounts said support flange and is adapted to slide in said key well while said key pattern moves to said retraction position after said support flange is broken or otherwise compromised.

24. A key in accordance with claim 23 wherein said bushing comprises an aperture that receives a stem on said key head.

25. A key in accordance with claim 20 wherein said breakable element comprises a breakable pin extending transversely through openings in said housing and either adjacent to said key head or through an opening in said key head.

26. A key in accordance with claim 16 wherein said key well is closed-ended and said retraction control member comprises a crushable element disposed between a closed end of said key well and said key head.

27. A key in accordance with claim 16 wherein said retraction control member is adapted to return said key pattern from said retraction position to said extension position after said tampering force is removed.

28. A key in accordance with claim 15 further including a stop surface adapted to contact a surface of a non-matching security fastener as said key pattern retracts to said retraction position.

29. A key in accordance with claim 28 wherein said housing comprises a shroud that provides said stop surface.

30. A key in accordance with claim 28 wherein said stop surface is provided by a ledge extending generally transversely from an edge of said key well.

31. A key in accordance with claim 28 wherein said key comprises plural stop surfaces.

32. A key in accordance with claim 15 wherein said key head is retained in said key well by a staked edge portion of said key well.

33. A key in accordance with claim 15 wherein said key head is retained in said key well by a retainer clip situated proximate to an edge portion of said key well.

34. A key in accordance with claim 15 wherein said key well and said key head comprise mutually slideable surface portions that are shaped to prevent rotation of said key head in said key well.

35. A key in accordance with claim 15 wherein said housing comprises a base end that is adapted to receive a handle or a tool.

36. A key in accordance with claim 35 wherein said housing base end comprises one of a male or female drive configuration.

37. A key in accordance with claim 15 wherein said key pattern is configured for use with a vehicular security fastener.

38. A key in accordance with claim 15 wherein said key pattern is configured for use with a non-vehicular security fastener.

39. A key in accordance with claim 15 wherein said key pattern comprises one of a male or female, continuous or non-continuous, curvilinear or non-curvilinear pattern or drive configuration.

40. A key for operating a security vehicular wheel lug nut or lug bolt fastener having a lock pattern, said key comprising:

a housing;

a base end and an open fastener-receiving end on said housing;

torque-receiving means associated with said housing base end for transferring rotational torque from a torquing source to said housing;

a key well in said housing;

a key head slidably disposed in said key well;

means for retaining said key head in said key well;

a key pattern on one end of said key head;

an opposite end of said key head having an end face that faces said housing base end and being free of torque-receiving shank structure extending beyond said housing base end;

torque-transfer means between said key well and said key head for transferring rotational torque imparted by said torquing source to said housing from said housing to said key head; and said key pattern being retractable by virtue of slideable movement of said key head in said key well between an operational extension position in which said key pattern is enabled for substantial engagement with a security fastener having a matching lock pattern, thereby allowing operation of the matching security fastener, and a non-operational retraction position in which said key pattern is not capable of substantial engagement with a security fastener having a non-matching lock pattern, thereby preventing operation of the non-matching security fastener; means responsive to a tampering force on said key head in excess of a normal operational force for controlling retraction of said key pattern from said extension position to said retraction position.

* * * * *